(No Model.)
R. G. WOOD.
TWO WHEELED VEHICLE.
No. 317,066. Patented May 5, 1885.
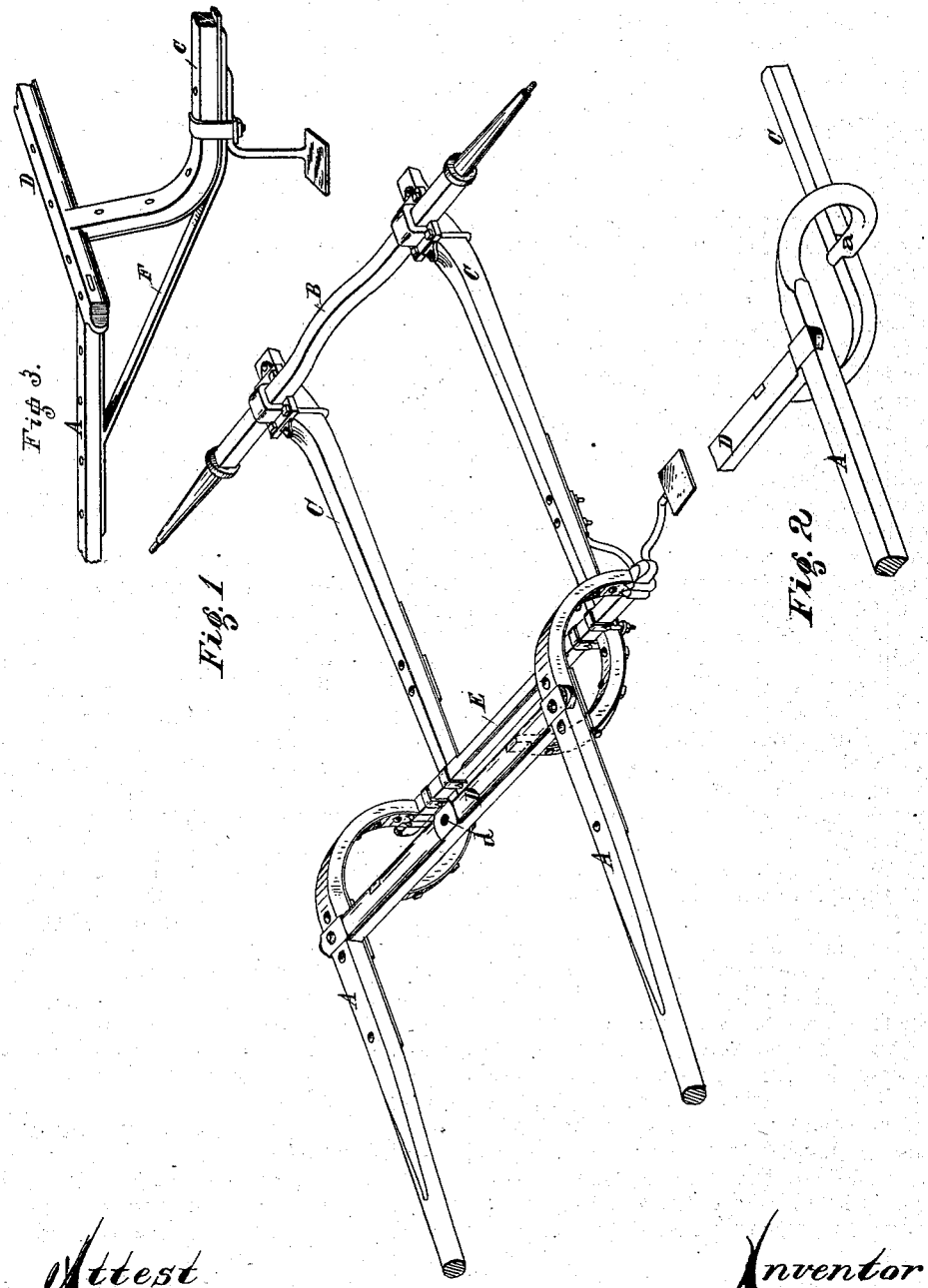
Attest
Alfred B. Benedict
Jacob J. Gessert
Inventor
Richard G. Wood
By Geo. J. Murray
Atty

UNITED STATES PATENT OFFICE.

RICHARD G. WOOD, OF CINCINNATI, OHIO, ASSIGNOR, BY MESNE ASSIGNMENTS, TO GEORGE J. MURRAY, OF SAME PLACE.

TWO-WHEELED VEHICLE.

SPECIFICATION forming part of Letters Patent No. 317,066, dated May 5, 1885.

Application filed April 27, 1883. (No model.)

*To all whom it may concern:*

Be it known that I, RICHARD G. WOOD, a citizen of the United States, residing at Cincinnati, county of Hamilton, State of Ohio, have invented certain new and useful Improvements in Two-Wheeled Vehicles, of which the following is a specification.

The object of my invention is a convenient means of connection between the shafts and axle, which will provide a foundation for the springs which support the body.

The invention consists, essentially, in two bars, which connect the cross-bar of the shafts with the axle, and certain means for firmly connecting the said bars to the shafts, all of which will be fully understood from the following description of the accompanying drawings, in which—

Figure 1 is a perspective view of the running-gear of a two-wheeled vehicle embodying my invention. Fig. 2 is a perspective view of another mode of connecting the shafts to my coupling-bar, and Fig. 3 is a similar view of my preferred mode of connecting the shafts and coupling-bar.

Like parts, wherever they occur in the different views, are indicated by similar reference-letters.

The shafts A and axle B are of ordinary construction. My coupling-rails C are preferably made of straight-grained wood bent at their forward ends to about a quarter of a circle. The upturned ends are connected to the cross-piece D, which braces the inner ends of the shafts and serves as a draft-bar, the central perforated clip, *d*, being for the reception of the single-tree pin. From the curved forward portion of the bars C they extend backward, preferably in a straight line, to the axle, to which they are clipped in any suitable manner.

In Fig. 1 have shown a pair of ordinary buggy-shafts, the downwardly-curved rear ends of which are clipped to the extended ends of a cross-brace, E, which is firmly clipped upon the coupling-bars C. The bars C in this figure terminate in an enlarged upwardly-curved end at the rear, upon which the axle B is secured by clips. In the form shown in Fig. 2 the cross-bar E is omitted, and the rear ends of the shafts have inward bends *a'*, which are secured in any suitable manner; but for economy in manufacture, convenience, and durability in use I prefer the form illustrated in Fig. 3. In this form the downwardly-curved rear ends of the shafts are dispensed with, and the shafts and coupling-bars C are firmly braced together by metal straps F, which are secured underneath the shafts, and curving downward underneath the bars C are securely united to them. These straps F may extend the full length of the bars C, thus greatly strengthening them and permitting the use of lighter material in the bars.

I prefer to make the forward end of the strap F bifurcated, so that one arm will bend around and strengthen the curved end of the bar C, while the other extends underneath and is secured to the shaft. The bars C (shown in Figs. 1 and 2) extend back underneath the axle in straight lines for convenience in attaching my improved J-springs, for supporting the back of the body, shown in my application filed April 17, 1883.

The forward part of the body is supported upon a spring or springs similar to those used upon side-bar buggies. Dispensing with the downwardly-bent ends of the shafts leaves more room to get in and out of the vehicle, and makes a much neater appearance.

It is evident that any of the well-known forms of bodies may be mounted upon my running-gear without requiring any special change of the body-supporting devices.

What I claim as new, and desire to secure by Letters Patent, is—

1. A draft and supporting frame for two-wheeled vehicles, consisting of two parts—viz., shafts and side bars—one of said parts being turned upwardly or downwardly and the two rigidly connected and braced together, substantially as described.

2. The combination of a thill and side bar for vehicles, the end of the thill being curved downwardly and secured to the side bar at a distance from its end, the said end being turned upwardly to meet the thill, or joined thereto by a brace, substantially as described.

RICHARD G. WOOD.

Witnesses:
  GEO. J. MURRAY,
  JACOB J. GESSERT.